(No Model.)
W. B. DRAPER.
FASTENING DEVICE.
No. 581,224. Patented Apr. 20, 1897.
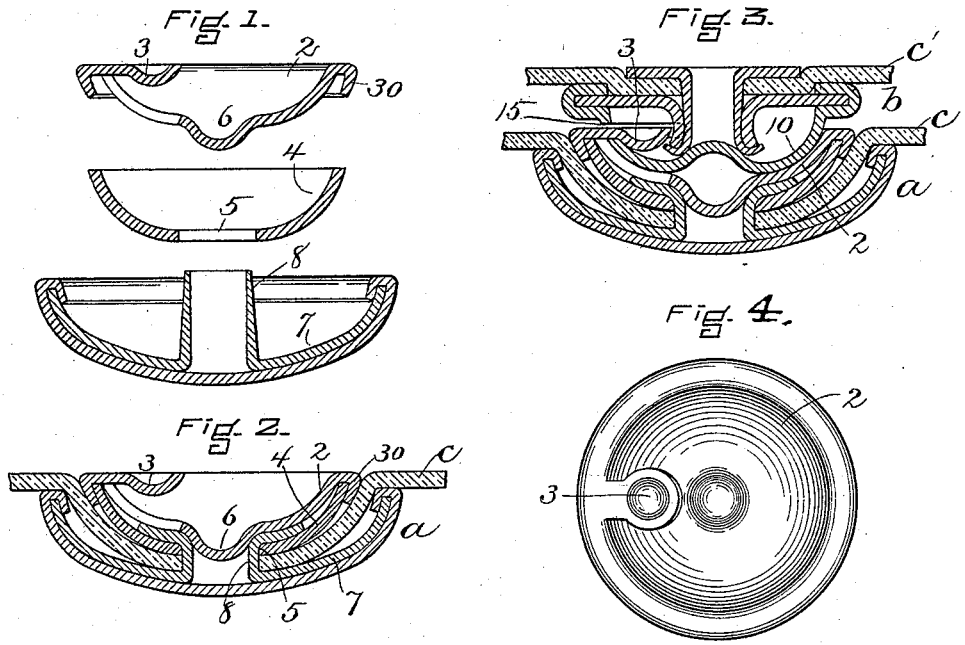
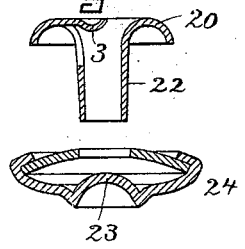
WITNESSES_
E. Batchelder
A. D. Adams
INVENTOR_
Wm. B. Draper
by Knight Brown Quinby
Attys

UNITED STATES PATENT OFFICE.

WILLIAM B. DRAPER, OF MALDEN, MASSACHUSETTS, ASSIGNOR OF TWO-THIRDS TO WARREN B. PAGE, OF NEWTON, MASSACHUSETTS.

FASTENING DEVICE.

SPECIFICATION forming part of Letters Patent No. 581,224, dated April 20, 1897.

Application filed January 20, 1896. Serial No. 576,095. (No model.)

*To all whom it may concern:*

Be it known that I, WILLIAM B. DRAPER, of Malden, in the county of Middlesex and State of Massachusetts, have invented certain new and useful Improvements in Fastening Devices, of which the following is a specification.

This invention relates to devices for fastening gloves and other like articles; and it has for its object to provide a simple and efficient fastening device the members of which are adapted to be readily connected and disconnected and when in use will be free from liability to accidental disconnection.

The invention also has for its object to provide an improved construction whereby the members of a two-part fastening device may be readily secured to the parts of a glove or other article to which they belong by clamping a part of the article between the outer portion or head and the inner portion or foot of each member.

The invention consists in the improvements which I will now proceed to describe and claim.

Of the accompanying drawings, forming a part of this specification, Figure 1 represents in different sectional views the parts of one member. Fig. 2 represents a sectional view of the member shown in Fig. 1, the parts being connected. Fig. 3 represents a sectional view showing the members of my improved fastening device connected. Fig. 4 represents a plan view of one of the parts shown in Fig. 1. Fig. 5 represents a modification.

In carrying out my invention I construct a fastening device composed of two members *a* and *b*, each comprising a locking part constructed to detachably interlock the other member and an attaching part adapted to be engaged with the locking part by the operation of pressing the two parts together, the material to which the member is to be applied being first interposed between the said parts, after which the parts are pressed together and are thus united and caused to firmly clamp the interposed material between them. The locking part of the member *a* in the construction here shown comprises a concave plate or disk 2, having a raised annular margin which surrounds a recess, and a tongue 3, cut out from the material of said plate and projecting inwardly from said margin over a portion of the recess. The marginal portion of the plate 2 is provided with a backwardly-turned flange 30, which engages the margin of a concave or cup-shaped washer 4, having a central orifice 5, which receives a boss or protuberance 6, formed on the central portion of the concave plate 2. The plate 2 and washer 4 are united by the flange 30, their form being such that a narrow cavity exists between them.

The attaching part of the member *a* includes a disk or flange 7, on which is formed a tubular shank 8, the outer end of which is adapted to be upset or spread, and thus caused to enter the space between the concave plate 2 and washer 4 when the parts are pressed together, the outer end of the tubular shank 8 entering the orifice 5 of the washer and encountering the boss 6, which spreads it and directs the spread portion outwardly into the cavity between the plate 2 and washer 4. It will be seen, therefore, that by inserting the tubular shank 8 through a hole in the piece of material *c* to which the member *a* is to be attached, leaving the flange 7 at one side of the piece, and then pressing the part composed of the plate 2 and washer 4 downwardly upon the tubular shank the outer end of the latter will be spread and caused to enter the cavity between the plate 2 and washer 4, as shown in Fig. 2, thus firmly uniting the two parts and clamping the piece *c* securely between them.

The head or interlocking part of the member *b* comprises a concavo-convex plate 10, having an inwardly-turned marginal flange 12 at its base and an inwardly-projecting boss 13 at its center, a slot 15 being formed close to the base of the said plate. A washer 16 is engaged by the flange 12 and has a central opening 17, surrounded by a flange 18, arranged over the said boss, the washer and plate being separated by a cavity. The attaching part is an eyelet comprising a flange 20 and a tubular shank 19, adapted to enter the opening 17 and be spread by the boss 13, the said shank passing through the material, while its spread portion enters the cavity between the plate 10 and washer 16 and is engaged with the end of the flange 18. The parts of the member b are united with each other and clamped to the portion c' of the article with which the fastener is used by placing the flange 20 at one side of said piece, passing the tubular shank 19 through the piece, inserting its outer end in the opening 17, then by pressing the parts together spreading the outer portion of the said shank and causing it to enter the cavity between the plate 10 and washer 16.

The convex locking part 10, having the slot 15, is formed to project into the recess of the locking part 2, as shown in Fig. 3, so that when the tongue 3 is engaged with the slot 15 the projection of the locking part 10 into the locking part 2 will to a certain extent prevent edgewise displacement of either member relatively to the other, the engagement of the tongue with the slot preventing both edgewise and lateral displacement or separation of the two members. The convex and concave form of the locking parts of the members is such that each member may turn or rock while in contact with the other and facilitates the engagement and separation of the two members, the members being separated by tipping one of the parts on the other and then withdrawing the tongue 3 from the slot 15.

The tongue 3 is preferably cup-shaped or concavo-convex, its outer side being concave, while its inner side, which is next to the recessed or concave surface of the plate 2, is convex, so that it conforms to the curvature of the inner surface of the plate 10 when engaged with the latter, as shown in Fig. 3, thus preventing accidental movement of either member to an extent calculated to withdraw the tongue 3 from the slot 15, the tongue being sufficiently resilient to permit it to be withdrawn from the slot by the exercise of a reasonable degree of force.

It will be seen from the foregoing that the parts of each member are readily attachable to the article with which they are to be used, no special tools being required, and that when attached they are free from possibility of accidental separation.

The tubular shanks 8 and 14 may be made with longitudinal slits, if desired, to facilitate the spreading of their outer ends by converting the same into prongs.

In Fig. 5 I show a different construction in which the recessed locking part is formed as an eyelet comprising a tubular shank 22 and a rolled flange 20, the material being partly cut out to form a tongue 3, adapted to engage the slotted convex part of the other member. The shank 22 is spread by a boss or projection 23 into a cavity in the attaching part 24, substantially as in the construction already described.

It will be seen that the described construction whereby each member is attached to the material enables a relatively small hole to be made in the material, the eyelet or tubular shank being comparatively small, so that there is no liability of pulling the member out of the material.

I claim—

1. A fastening device comprising a recessed member having a raised margin and a curved tongue projecting inwardly therefrom over the recess, and a concavo-convex member formed to project into the recessed member and having a slot arranged to receive said tongue, the convex side of which interlocks with the concave side of the concavo-convex member, said members having suitable provisions for their attachment to the parts to be connected by the device.

2. A fastening device comprising two members, one having a recessed portion, a raised margin surrounding the recess, and an elastic tongue projecting inwardly from the margin over the recess, while the other member has a projecting portion formed to enter the said recess and provided with a slot formed to receive said tongue, each member being composed of two parts, one of which has a tubular shank or eyelet adapted to be spread at its outer end, while the other has a shank-spreading boss and a cavity surrounding the same to receive the spread portion of the shank.

3. A fastening device comprising a concavo-convex plate having a slot in one side and an inwardly-projecting boss at its center, a washer engaged with the flanged base of the plate and having a central opening opposite the boss, and an attaching-eyelet the tubular shank of which is adapted to pass through the opening in the washer and be spread by the boss into the cavity between the washer and plate.

In testimony whereof I have signed my name to this specification, in the presence of two subscribing witnesses, this 16th day of January, A. D. 1896.

WILLIAM B. DRAPER.

Witnesses:
C. F. BROWN,
A. D. HARRISON.